United States Patent
Zhang et al.

(10) Patent No.: US 8,611,244 B2
(45) Date of Patent: Dec. 17, 2013

(54) METHOD AND APPARATUS FOR MULTI-INPUT MULTI-OUTPUT DOWNLINK TRANSMISSION CONTROL

(75) Inventors: Gong Zhang, Shenzhen (CN); Yi Long, Beijing (CN); Kaibin Huang, Shenzhen (CN); Yong Cheng, Shenzhen (CN); Kin (Vincent) Nang Lau, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 13/278,645

(22) Filed: Oct. 21, 2011

(65) Prior Publication Data

US 2012/0093016 A1    Apr. 19, 2012

Related U.S. Application Data

(63) Continuation of application No. PCT/CN2010/071909, filed on Apr. 20, 2010.

(30) Foreign Application Priority Data

Apr. 21, 2009 (CN) .......................... 2009 1 0130992

(51) Int. Cl.
*H04L 12/26* (2006.01)
(52) U.S. Cl.
USPC .......................................... 370/252; 455/434
(58) Field of Classification Search
USPC ................. 370/252; 455/434; 375/260, 267
See application file for complete search history.

(56) References Cited

U.S. PATENT DOCUMENTS

| | | | |
|---|---|---|---|
| 8,259,871 B2* | 9/2012 | Hosokawa et al. | 375/341 |
| 2003/0220103 A1 | 11/2003 | Kim et al. | |
| 2004/0077378 A1 | 4/2004 | Kim et al. | |
| 2004/0120411 A1* | 6/2004 | Walton et al. | 375/260 |
| 2005/0181739 A1 | 8/2005 | Krasny et al. | |
| 2005/0243942 A1* | 11/2005 | Sawai | 375/267 |
| 2007/0042720 A1 | 2/2007 | Pan et al. | |
| 2008/0219369 A1 | 9/2008 | Wu et al. | |

(Continued)

FOREIGN PATENT DOCUMENTS

| CN | 1450822 | 10/2003 |
|---|---|---|
| CN | 1496143 A | 5/2004 |

(Continued)

OTHER PUBLICATIONS

Extended European Search Report from the European Patent Office in corresponding European Application No. EP 10 76 6627 mailed Mar. 19, 2012.

(Continued)

*Primary Examiner* — Albert T Chou
(74) *Attorney, Agent, or Firm* — Conley Rose, P.C.; Grant Rodolph; Nicholas K. Beaulieu (57) ABSTRACT

A Multi-Input Multi-Output (MIMO) downlink transmission control method that is related to communications technologies is disclosed in embodiments of the present invention. The method includes: obtaining a channel fading change rate and a feedback delay of a user; calculating out a closed-loop MIMO throughput gain according to the channel fading change rate and the feedback delay; and determining a downlink transmission mode according to the closed-loop MIMO throughput gain, wherein the downlink transmission mode includes a closed-loop mode or an open-loop mode. A MIMO downlink transmission control apparatus is also disclosed.

20 Claims, 3 Drawing Sheets

(56) References Cited

U.S. PATENT DOCUMENTS

| | | |
|---|---|---|
| 2009/0003475 A1 | 1/2009 | Erceg et al. |
| 2009/0034639 A1* | 2/2009 | Hwang et al. ............... 375/260 |
| 2009/0103590 A1* | 4/2009 | Dabak et al. ............... 375/130 |
| 2010/0075672 A1* | 3/2010 | Jwa et al. ............... 455/434 |
| 2011/0211488 A1* | 9/2011 | Kwon et al. ............... 370/252 |

FOREIGN PATENT DOCUMENTS

| | | |
|---|---|---|
| CN | 1691536 | 11/2005 |
| CN | 1805326 | 7/2006 |
| CN | 1829113 | 9/2006 |
| CN | 1893308 | 1/2007 |
| CN | 1918840 A | 2/2007 |
| EP | 1 381 172 A1 | 1/2004 |
| WO | WO 2009/025029 A1 | 2/2009 |
| WO | WO 2009/031184 A1 | 3/2009 |
| WO | WO 2010/121537 A1 | 10/2010 |

OTHER PUBLICATIONS

Written Opinion of the International Searching Authority mailed on Jul. 29, 2010 regarding International Application No. PCT/CN2010/071909, filed Apr. 20, 2010, 4 pages.

Cai et al., "Performance Analysis to Open and Close Loop Transmit Diversity Schemes in Slow Fading Rayleigh Channel," Journal of Beijing Electronic Science and Technology Institute, vol. 12, No. 2, Jun. 2004, China Academic Journal Electronic Publishing House, http://www.cnki.net, 7 pages.

* cited by examiner

METHOD AND APPARATUS FOR MULTI-INPUT MULTI-OUTPUT DOWNLINK TRANSMISSION CONTROL

CROSS-REFERENCE TO RELATED APPLICATIONS

This application is a continuation of International Application No. PCT/CN2010/071909, filed on Apr. 20, 2010, which claims priority to Chinese Patent Application No. 200910130992.9, filed on Apr. 21, 2009, both of which are hereby incorporated by reference in their entireties.

FIELD OF THE INVENTION

The present invention relates to communication technologies, and in particular, to a method and an apparatus for Multi-Input Multi-Output (MIMO) downlink transmission control.

BACKGROUND OF THE INVENTION

The MIMO technology has been widely applied in the current high-speed communication and next-generation wireless communication systems. Currently, the MIMO is an important physical-layer part of the latest communication standard. If Channel State Information (CSI) needs to be fed back, the MIMO technology is called a closed-loop technology; otherwise, the MIMO technology is called an open-loop technology. Generally, by using the CSI fed back, the closed-loop technology is better than the open-loop technology in that the former supports precoding to accomplish better link reliability, higher system throughput, and simpler receiver structure.

However, the performance of a closed-loop system is vulnerable to errors such as feedback delay, user mobility, and CSI quantization error. The current research on the closed-loop system is focused on the attempts to design an effective quantization algorithm under finite feedback conditions, specify how the CSI quantization errors affect the downlink throughput, so as to obtain various codeword-based precoding algorithms. In the process of implementing the present invention, the inventor finds at least the following defects in the prior art:

Most multi-user MIMO downlink scheduling algorithms in the prior art take only the CSI of the user into account, and cannot reflect mobility properly, and the existing MIMO schemes do not support intermixing of open-loop coding modes and closed-loop coding modes.

SUMMARY OF THE INVENTION

The embodiments of the present invention provide a method and an apparatus for MIMO downlink transmission control, with a view to taking feedback delay and mobility into account in downlink transmission control, and supporting intermixing of open loops and closed loops.

A MIMO downlink transmission control method provided in an embodiment of the present invention includes:
obtaining a channel fading change rate and a feedback delay of a user;
calculating out a closed-loop MIMO throughput gain according to the channel fading change rate and the feedback delay; and
determining a downlink transmission mode according to the closed-loop MIMO throughput gain, where the downlink transmission mode includes a closed-loop mode or an open-loop mode.

A MIMO downlink transmission control apparatus provided in an embodiment of the present invention includes:
an obtaining unit, configured to obtain a channel fading change rate and a feedback delay of a user;
a calculating unit, configured to calculate out a closed-loop MIMO throughput gain according to the channel fading change rate and the feedback delay; and
a mode switching control unit, configured to determine a downlink transmission mode according to the closed-loop MIMO throughput gain, where the downlink transmission mode includes a closed-loop mode or an open-loop mode.

The foregoing technical solutions reveal that: In the embodiments of the present invention, a downlink transmission mode is selected according to the channel fading change rate (namely, mobility) and the feedback delay of the user, and therefore, different operation modes (an open-loop mode and a closed-loop mode) are supported simultaneously to facilitate multi-user joint transmission, and the downlink throughput is increased by increasing mobility of users.

DETAILED DESCRIPTION OF THE EMBODIMENTS

The following detailed description is given in conjunction with the accompanying drawings in order to provide a thorough understanding of the present invention. Evidently, the described embodiments are merely part of rather than all embodiments of the present invention. All other embodiments, which can be derived by those skilled in the art from the described embodiments of the present invention without any creative effort, shall fall within the protection scope of the present invention.

A MIMO downlink transmission control method is provided in an embodiment of the present invention. Downlink transmission refers to data transmission from a Base Station (BS) to a Mobile Station (MS). A MIMO downlink transmission control method in the embodiment includes:
obtaining a channel fading change rate and a feedback delay of a user;
calculating out a closed-loop MIMO throughput gain according to the channel fading change rate and the feedback delay; and
determining a downlink transmission mode according to the closed-loop MIMO throughput gain, where the downlink transmission mode includes a closed-loop mode or an open-loop mode.

In this embodiment, a downlink transmission mode is selected according to the channel fading change rate (namely, mobility) and the feedback delay of the user, and therefore, different operation modes (an open-loop mode and a closed-loop mode) are supported simultaneously to facilitate multi-user joint transmission, and the downlink throughput is increased by using mobility difference between users.

Figure 1:
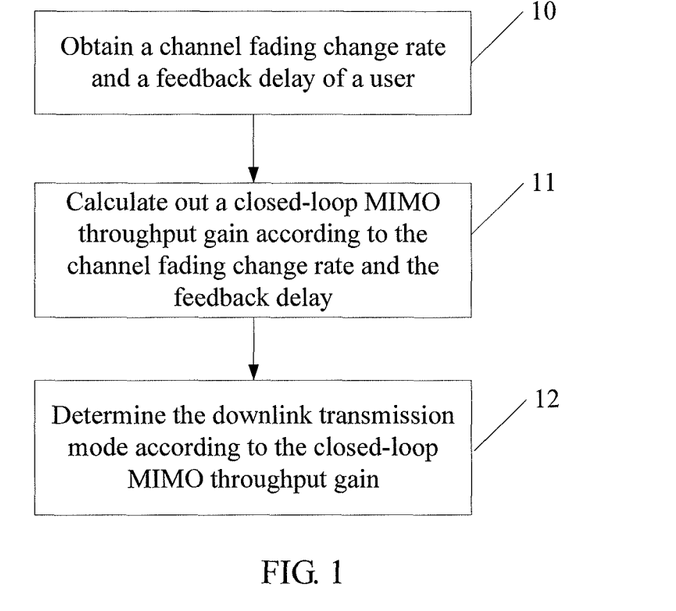
FIG. 1 is a flowchart of a MIMO downlink transmission control method according to an embodiment of the present invention.

A MIMO downlink transmission control method is provided in an embodiment of the present invention. As shown in FIG. 1, the method includes the following steps:

Step 10: Obtain a channel fading change rate and a feedback delay of a user.

The channel fading change rate of the user may be calculated out according to parameter information carried in pilot signals. A first mode of obtaining the channel fading change rate of the user is as follows:

The BS receives the pilot signals sent by the user; obtains CSI according to the parameter information (such as channel estimation) carried in the pilot signals; and calculates out the channel fading change rate of the user according to the CSI, namely, calculates out the channel fading change rate according to the pilot signals sent by the user. In this embodiment, the method of calculating out the channel fading change rate of the user according to the CSI is: Obtain the CSI according to the parameter information carried in the pilot signals, estimate a channel coefficient by sampling the pilot signals at a specific frequency, calculate out a relevant function according to the channel coefficient, and perform Fourier transformation for the relevant function to obtain a normalized channel fading change rate. For example, the pilot signals are sampled at a frequency of $$\frac{1}{Ts}$$

($T_s$ indicates a sampling period), the channel coefficient sequence $h_1$, h2, ..., and $h_N$ is estimated, and the relevant function $$S(\tau) = \sum_{n=1}^{N} h_n * h_{n+\tau}$$

is calculated; and Fourier transformation is performed for this function to obtain a normalized channel fading change rate $f_d$, $T_s$.

A second mode of obtaining the channel fading change rate of the user is as follows:

The BS receives the channel fading change rate that is calculated, according to parameter information carried in the pilot signals sent by the BS, by the MS and that is sent by the MS, namely, the MS calculates out the channel fading change rate according to the pilot signals sent by the BS and sends the channel fading change rate to the BS. The MS calculates the channel fading change rate in the same way as the BS calculating the channel fading change rate.

In the embodiment, the BS estimates the feedback delay by calculating the transmission delay of the training sequence signals sent by the MS, for example, the delay can be calculated by using a Turin discrete time model. In the embodiment, the feedback delay is not necessarily estimated through the training sequence signals. Instead, the variable quantity of feedback delay includes a transmission delay includes a transmission delay, and, if the transmission delay is ignored, the feedback delay can be calculated according to the system frame structure directly.

Step 11: Calculate out the closed-loop MIMO throughput gain according to the channel fading change rate and the feedback delay.

The closed-loop MIMO throughput gain may be regarded as a throughput difference between the closed-loop MIMO throughput and the open-loop MIMO throughput. The BS calculates the closed-loop MIMO throughput gain for each user. Generally, in an environment with strong scattering, the closed-loop MIMO throughput gain may be expressed as $\alpha\lambda^D$, where $\alpha$ is a constant, $\lambda$ is a parameter related to the fading change rate, and D is a feedback delay of the user.

Step 12: Determine a downlink transmission mode according to the closed-loop MIMO throughput gain, where the downlink transmission mode includes a closed-loop mode or an open-loop mode.

If the closed-loop MIMO throughput gain is greater than or equal to a first threshold, the closed-loop mode is applied to perform downlink transmission. If the closed-loop MIMO throughput gain is less than a second threshold, the open-loop mode is applied to perform downlink transmission. In practice, the first threshold may be the same as the second threshold or may be different from the second threshold. If the first threshold is different from the second threshold, a gray zone is regarded to exist between the first threshold and the second threshold. The original mode remains unchanged when the closed-loop MIMO throughput gain falls between the first threshold and the second threshold.

The foregoing technical solutions reveals that: In the embodiments of the present invention, a downlink transmission mode is selected according to the channel fading change rate (namely, mobility) and the feedback delay of the user, and therefore, different operation modes (an open-loop mode and a closed-loop mode) are supported simultaneously to facilitate multi-user joint transmission, and the downlink throughput is increased by using mobility difference between users.

The BS selects a different operation mode on the basis of the closed-loop MIMO throughput gain of each user. Meanwhile, a feedback controller may adjust the user's feedback frequency and feedback bandwidth through mobility of the user, so as to relieve performance deterioration caused by mobility.

Further, the feedback frequency control process in this embodiment is: The frequency of the user feeding back the CSI is adjusted according to the channel fading change rate, and the frequency of the user feeding back the CSI increases with the increase of the channel fading change rate. Preferably, the frequency of the user feeding back the CSI increases linearly with the increase of the channel fading change rate. In this way, the CSI feedback of multiple users can be compressed by using the channel-time correlation. That is, based on one user's frequency of feeding back the CSI, other users' frequency of feeding back the CSI is obtained according to the time correlation.

The process of controlling feedback bandwidth allocation in this embodiment is: Judge whether the channel fading change rate is less than a preset threshold; if the channel fading change rate is less than the preset threshold, allocate feedback bandwidth to the user proportionally according to different channel fading change rate; if the channel fading change rate is not less than the preset threshold, allocate no feedback bandwidth to the user, namely, switch the MS that moves at a high speed to an open-loop mode. In this way, the feedback bandwidth is allocated according to mobility of the user, which relieves performance deterioration caused by mobility.

The users are scheduled after the operation mode is selected and the feedback frequency and the feedback bandwidth are allocated. At the time of scheduling users, the closed-loop user of the greatest channel energy may be scheduled first, and then in the scheduling queue the user of the greatest throughput is scheduled, and so on, until all users are scheduled. "Scheduling" mentioned in this embodiment includes: allocating resources, and arranging the data to be sent subsequently.

After completion of scheduling, the signals of the user are coded. The following two coding schemes are provided:

A first coding scheme is: Use a space-time coding mode to encode the open-loop user signals first, and then perform precoding for the closed-loop user signals in a specific coding mode, where the specific coding mode generates interference onto the open-loop user signals but the interference is less than a preset threshold. More specifically, the first coding scheme is:

Select coding signals of open-loop user A in a space-time coding matrix; before encoding signals of closed-loop user B, apply a space-time coding mode to the signals of open-loop user A. Meanwhile, a precoding subset of user B exists and meets the following condition: After precoding the signals of closed-loop user B, the interference generated onto the signals of open-loop user A is less than a preset threshold, namely, when the precoding is performed for the signals of closed-loop user B, it is required to ensure that the average interference power of the signals from closed-loop user B to open-loop user A is less than a preset threshold. The precoding subset may be obtained by calculating the subspace distance in the space-time code matrix used by open-loop user A; and a precoding subset that can maximize throughput of closed-loop user B is selected according to the fed back CSI of closed-loop user B.

A second coding scheme is: Precode the direct signal component of the channel of the open-loop user, and then precode, according to the precoding result of the open-loop user, the channel of the closed-loop user based on the orthogonality to the channel of the open-loop user.

The direct signal component of the Rice channel of the open-loop user according to the embodiments of the present invention refers to long-term CSI, and is an average value of CSI fed back by the user in a preset long period.

Currently, finite traffic makes the open-loop user unable to make full use of given time-frequency resources, and leads to low orthogonal access efficiency. This coding scheme multiplexes some closed-loop users onto the open-loop users to improve the spectrum efficiency. Generally, an open-loop user channel is a Rice channel, and the slowly changing direct signal component of the Rice channel may be obtained through feedback. Therefore, the channel vector of open-loop user A may be expressed as $$h_A = \sqrt{\frac{K}{K+1}} h_A^{LOS} + \sqrt{\frac{1}{K+1}} h_A^r,$$

where $h_A^{Los}$ represents the direct signal component of the channel, and changes slowly;

$h_A^r$ represents the multipath component of the channel, and changes quickly; and K is a Rice factor, which decides a ratio of power in $h_A^{Los}$ to power in $h_A^r$.

Suppose that $h_B$ represents the channel vector of closed-loop user B, and the channel is a Rayleigh channel. In the process of scheduling the open-loop user A, a user B is selected among multiple closed-loop users that are to be scheduled, where the channel of user B is made to be orthogonal to $h_A^{Los}$, and most approximately reflects CSI channel feature that is fed back:

In the precoding processing, a matched filter is used to transmit beam forming for open-loop user A. The formula $$f_A = \frac{(h_A^{LOS})^H}{\|h_A^{LOS}\|}$$

represents the precoding of user A. For closed-loop user B, to reduce interference caused onto user A, a precoding scheme of user B should be selected so that the channel of user B is orthogonal to $h_A^{Los}$ and most compliant with the CSI fed back by user B. The specific calculation method may be as follows:

Calculate $\|h_A^{los} V_B\|=0$ to obtain zero space $V_B$ of U-matrix; calculate $\min\|V_B * X - h_B\|$ to obtain the selection result of user B and the similar channel feature $V_B * X$; finally, use formula $$f_B = \frac{(V_B * X)^H}{\|V_B * X\|}$$

to obtain precoding of user B.

In the embodiment, the channel fading change rate (namely, mobility) and the feedback delay of the user are obtained according to parameter information carried in the pilot signals, and the downlink throughput is increased by using mobility difference between users. Moreover, the closed-loop MIMO throughput gain is calculated according to the channel fading change rate (namely, mobility) and the feedback delay, and the closed-loop MIMO throughput gain is used as a basis for determining the open-loop mode and the closed-loop mode. Therefore, different operation modes (an open-loop mode and a closed-loop mode) are supported simultaneously to facilitate multi-user joint transmission.

Figure 2:
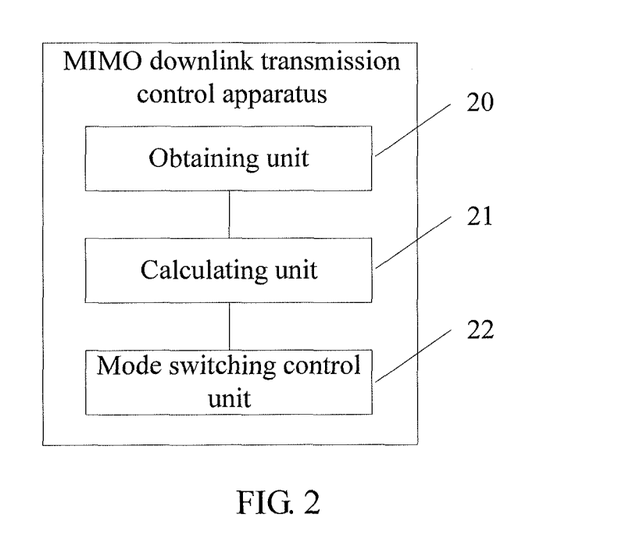
FIG. 2 is a schematic structure diagram of a MIMO downlink transmission control apparatus according to an embodiment of the present invention.

A MIMO downlink transmission control apparatus is provided in an embodiment of the present invention. As shown in FIG. 2, the apparatus includes:

an obtaining unit 20, configured to obtain a channel fading change rate and a feedback delay of a user;

a calculating unit 21, configured to calculate out a closed-loop MIMO throughput gain according to the channel fading change rate and the feedback delay; and a mode switching control unit 22, configured to determine a downlink transmission mode according to the closed-loop MIMO throughput gain, where the downlink transmission mode includes a closed-loop mode or an open-loop mode.

Figure 3:
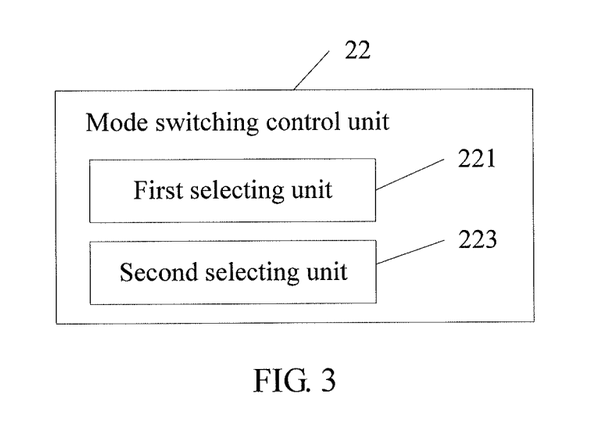
FIG. 3 is a schematic structure diagram of a mode selection and switching control unit in a MIMO downlink transmission control apparatus shown in FIG. 2.

As shown in FIG. 3, the mode selection and switching control unit 22 includes:

a first selecting unit 221, configured to select a closed-loop mode for downlink transmission if the closed-loop MIMO throughput gain is greater than or equal to a first threshold; and a second selecting unit 223, configured to select an open-loop mode for downlink transmission if the closed-loop MIMO throughput gain is less than a second threshold.

Figure 4:
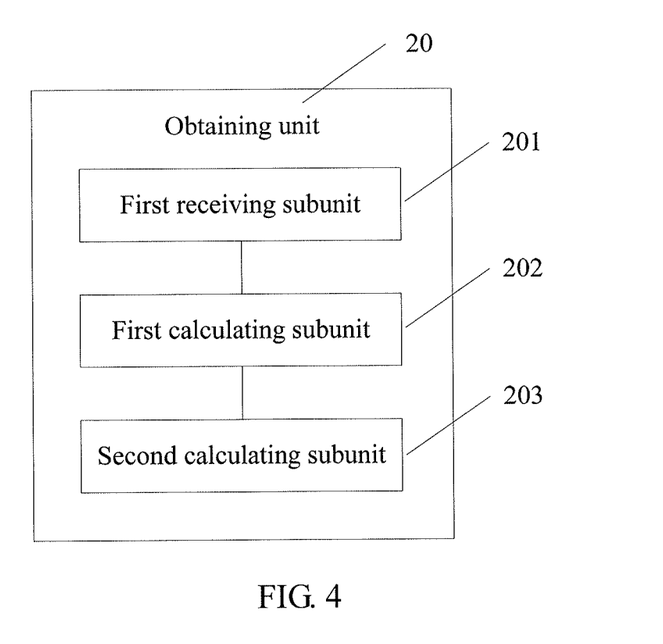
FIG. 4 is a schematic structure diagram of an obtaining unit in a MIMO downlink transmission control apparatus shown in FIG. 2.

As shown in FIG. 4, the obtaining unit 20 further includes:

a first receiving subunit 201, configured to receive pilot signals;

a first calculating subunit, configured to calculate CSI according to parameter information carried in the pilot signals; and a second calculating subunit 203, configured to calculate out the channel fading change rate and the feedback delay of the user according to the CSI.

Figure 5:
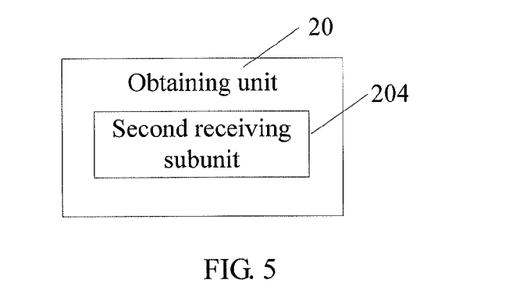
FIG. 5 is another schematic structure diagram of an obtaining unit in a MIMO downlink transmission control apparatus shown in FIG. 2.

Alternatively, as shown in FIG. 5, the obtaining unit 20 further includes:

a second receiving subunit 204, configured to receive from the user the channel fading change rate and the feedback delay of the user, where the channel fading change rate and the feedback delay are calculated out according to parameter information carried in the pilot signals.

Figure 6:
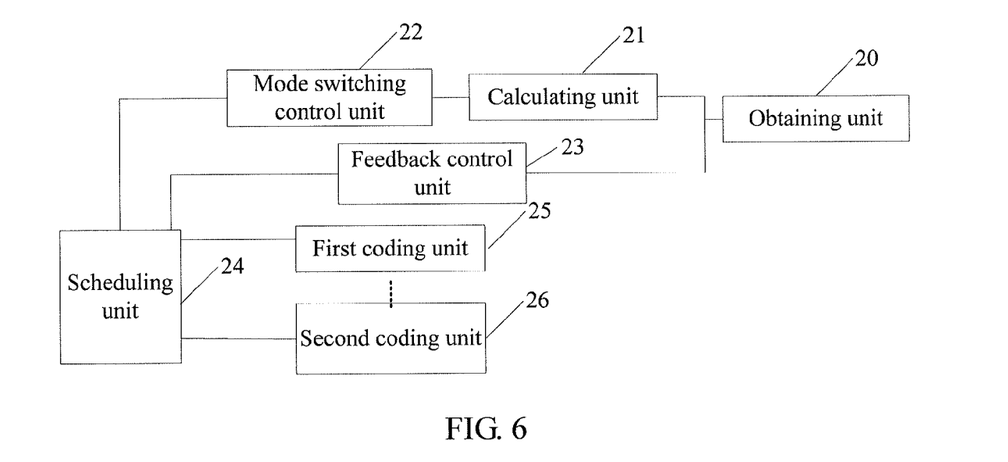
FIG. 6 is a schematic structure diagram of a MIMO downlink transmission control apparatus according to another embodiment of the present invention.

As shown in FIG. 6, the MIMO downlink transmission control apparatus may further include:

a feedback control unit 23, configured to: adjust, according to the channel fading change rate, the frequency of the user feeding back the CSI after obtaining the channel fading change rate; judge whether the channel fading change rate is lower than a preset threshold; if the channel fading change rate is lower than the preset threshold, allocate feedback bandwidth to the user proportionally according to different channel fading change rate; if the channel fading change rate is not lower than the preset threshold, allocate no feedback bandwidth;

a scheduling unit 24, configured to schedule users, and specifically, schedule the closed-loop user of the greatest channel energy first, and then in a scheduling queue schedule the user of the greatest throughput;

a first coding unit 25, configured to apply different coding modes to differentiate loop modes of the user, and specifically, use a space-time coding mode to encode the open-loop user signals, and then perform precoding for the closed-loop user signals in a specific coding mode, where the specific coding mode generates interference onto the open-loop user signals but the interference is less than a preset threshold; and a second coding unit 26, configured to apply different coding modes to differentiate user modes, and specifically, precode the direct signal component of the channel of the open-loop user, and then precode, according to the precoding result of the open-loop user, the closed-loop user signals on the basis of the orthogonality to the channel of the open-loop user.

In practice, more than one first coding unit and more than one second coding unit may be set accordingly.

The foregoing technical solutions provided in the embodiments of the present invention reveals that: In the embodiment of the present invention, a downlink transmission mode is selected according to the channel fading change rate (namely, mobility) and the feedback delay of the user, and therefore, different operation modes (an open-loop mode and a closed-loop mode) are supported simultaneously to facilitate multi-user joint transmission, and the downlink throughput is increased by using mobility difference between users.

In conclusion, in the embodiments of the present invention, a downlink transmission mode is selected according to the channel fading change rate (namely, mobility) and the feedback delay of the user, and therefore, the downlink throughput is increased by using mobility difference between users. Moreover, different operation modes (an open-loop mode and a closed-loop mode) are supported simultaneously to facilitate multi-user joint transmission. Persons of ordinary skill in the art understand that all or part of the steps of the method in the embodiments of the present invention may be implemented by a program instructing relevant hardware. The program may be stored in computer readable storage media. The computer readable storage media may be a Read Only Memory (ROM), Random Access Memory (RAM), magnetic disk, or CD-ROM.

What is claimed is:

1. A Multi-Input Multi-Output (MIMO) downlink transmission control method, comprising:

obtaining with an obtaining unit a channel fading change rate and a feedback delay of a user;

calculating with a calculating unit a closed-loop MIMO throughput gain according to the channel fading change rate and the feedback delay; and determining with a mode switching control unit a downlink transmission mode according to the closed-loop MIMO throughput gain, wherein the downlink transmission mode comprises one of a closed-loop mode and an open-loop mode.

2. The method according to claim 1, wherein determining with the mode switching control unit the downlink transmission mode according to the closed-loop MIMO throughput gain comprises performing downlink transmission by using a closed-loop mode when the closed-loop MIMO throughput gain is greater than or equal to a first threshold.

3. The method according to claim 1, wherein determining with the mode switching control unit the downlink transmission mode according to the closed-loop MIMO throughput gain comprises performing downlink transmission by using an open-loop mode when the closed-loop MIMO throughput gain is less than a second threshold.

4. The method according to claim 1, further comprising adjusting, according to the channel fading change rate, frequency of the user feeding back Channel State Information (CSI) after obtaining the channel fading change rate, wherein the frequency of the user feeding back the CSI increases with an increase of the channel fading change rate.

5. The method according to claim 1, further comprising:

judging whether the channel fading change rate is lower than a preset threshold value;

allocating feedback bandwidth to the user according to the channel fading change rate when the channel fading change rate is lower than the preset threshold value; and allocating no feedback bandwidth when the channel fading change rate is not lower than the preset threshold value.

6. The method according to claim 4, further comprising scheduling users, wherein a closed-loop user of greatest channel energy is scheduled first and a user of greatest throughput is then scheduled in a scheduling queue.

7. The method according to claim 6, further comprising:

using a space-time coding mode to encode open-loop user signals; and precoding closed-loop user signals in a coding mode, wherein the coding mode generates interference onto the open-loop user signals, and wherein the interference is less than a preset threshold.

8. The method according to claim 6, further comprising:

precoding a direct signal component of a channel of an open-loop user; and precoding, according to a precoding result of the open-loop user, signals of a closed-loop user on the basis of orthogonality to the channel of the open-loop user.

9. The method according to claim 1, wherein the channel fading change rate is calculated according to parameter information carried in pilot signals, and wherein obtaining with the obtaining unit the channel fading change rate and the feedback delay of the user comprises:

receiving the pilot signals sent by the user;
obtaining Channel State Information (CSI) according to the parameter information carried in the pilot signals; and
calculating the channel fading change rate and the feedback delay of the user according to the CSI.

10. The method according to claim 1, wherein calculating with the calculating unit the closed-loop MIMO throughput gain according to the channel fading change rate and the feedback design comprises expressing the closed-loop MIMO throughput gain as $\alpha\lambda^D$, wherein $\alpha$ is a constant, wherein $\lambda$ is a channel-fading-change-rate-parameter derived from the channel fading change rate, and wherein D is the feedback delay.

11. A Multi-Input Multi-Output (MIMO) downlink transmission control apparatus, comprising:
an obtaining unit configured to obtain a channel fading change rate and a feedback delay of a user;
a calculating unit configured to calculate a closed-loop MIMO throughput gain according to the channel fading change rate and the feedback delay; and
a mode switching control unit configured to determine a downlink transmission mode according to the closed-loop MIMO throughput gain,
wherein the downlink transmission mode comprises a closed-loop mode or an open-loop mode.

12. The apparatus according to claim 11, wherein the mode switching control unit comprises a first selecting unit that is configured to select a closed-loop mode for downlink transmission when the closed-loop MIMO throughput gain is greater than or equal to a first threshold.

13. The apparatus according to claim 11, wherein the mode switching control unit comprises a second selecting unit that is configured to select an open-loop mode for downlink transmission when the closed-loop MIMO throughput gain is less than a second threshold.

14. The apparatus according to claim 11, wherein the obtaining unit further comprises:
a first receiving subunit configured to receive pilot signals;
a first calculating subunit configured to calculate Channel State Information (CSI) according to parameter information carried in the pilot signals; and
a second calculating subunit configured to calculate out the channel fading change rate and the feedback delay of the user according to the CSI.

15. The apparatus according to claim 11, wherein the obtaining unit further comprises a second receiving subunit configured to receive from the user the channel fading change rate and the feedback delay of the user, and wherein the channel fading change rate and the feedback delay are calculated according to parameter information carried in pilot signals.

16. The apparatus according to claim 11, further comprising a feedback control unit configured to:
adjust, according to the channel fading change rate, frequency of the user feeding back Channel State Information (CSI) after obtaining the channel fading change rate;
judge whether the channel fading change rate is lower than a preset threshold;
allocate feedback bandwidth to the user proportionally according to different channel fading change when the channel fading change rate is lower than the preset threshold; and
allocate no feedback bandwidth when the channel fading change rate is not lower than the preset threshold.

17. The apparatus according to claim 11, further comprising a scheduling unit configured to schedule users, wherein the scheduling unit is configured to first schedule a closed-loop user of greatest channel energy and then schedule a user of greatest throughput in a scheduling queue.

18. The apparatus according to claim 11, further comprising a first coding unit configured to use a space-time coding mode to encode open-loop user signals and then perform precoding for closed-loop user signals in a coding mode, wherein the coding mode generates interference onto the open-loop user signals, and wherein the interference is less than a preset threshold.

19. The apparatus according to claim 11, further comprising a second coding unit configured to apply different coding modes to differentiate user modes, wherein the second coding unit is configured to precode a direct signal component of a channel of an open-loop user and then precode, according to a precoding result of the open-loop user, signals of a closed-loop user on the basis of orthogonality to the channel of the open-loop user.

20. The apparatus according to claim 11, wherein the calculating unit uses a formula $\alpha\lambda^D$ to calculate the closed-loop MIMO throughput gain, wherein $\alpha$ is a constant, wherein $\lambda$ is a parameter of the channel fading change rate, and wherein D is the feedback delay.

* * * * *

UNITED STATES PATENT AND TRADEMARK OFFICE
CERTIFICATE OF CORRECTION

| | | |
|---|---|---|
| PATENT NO. | : 8,611,244 B2 | Page 1 of 1 |
| APPLICATION NO. | : 13/278645 | |
| DATED | : December 17, 2013 | |
| INVENTOR(S) | : Gong Zhang et al. | |

It is certified that error appears in the above-identified patent and that said Letters Patent is hereby corrected as shown below:

Title Page 2, References Cited, under Other Publications, the following cited art should read:

"Cai, Z., et al., "Performance Analysis to Open and Close Loop Transmit Diversity Schemes in Slow Fading Rayleigh Channel", Journal of Beijing Electronic Science and Technology Institute, vol. 12, No. 2, Jun. 2004, China Academic Journal Electronic Publishing House, http://www.cnki.net, 7 pages."

In the Claims

Claim 16, Column 10/Line 15 should read: "according to different channel fading change rates when the"

Signed and Sealed this
Eleventh Day of March, 2014

Michelle K. Lee
*Deputy Director of the United States Patent and Trademark Office*